Aug. 24, 1954

H. F. ROST ET AL 2,687,209

ENDLESS CONVEYER OR ELEVATOR BELT
AND RESILIENT JOINT FOR SAME

Filed Sept. 20, 1950

INVENTOR
HELGE FABIAN ROST
BY E. Traum
ATTORNEY

Aug. 24, 1954
H. F. ROST ET AL
2,687,209
ENDLESS CONVEYER OR ELEVATOR BELT
AND RESILIENT JOINT FOR SAME
Filed Sept. 20, 1950
2 Sheets-Sheet 2
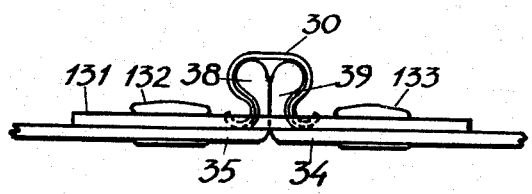
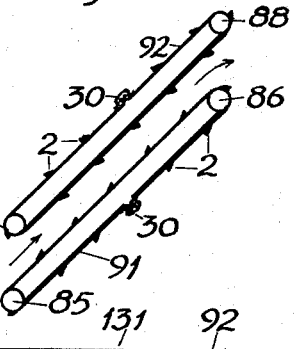
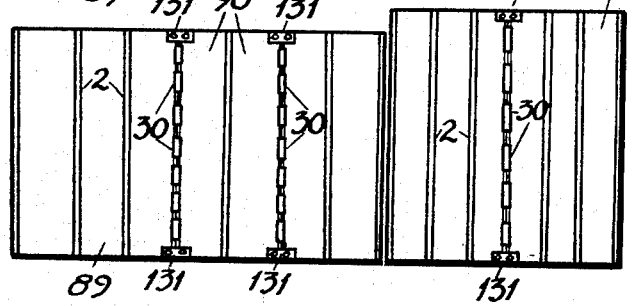
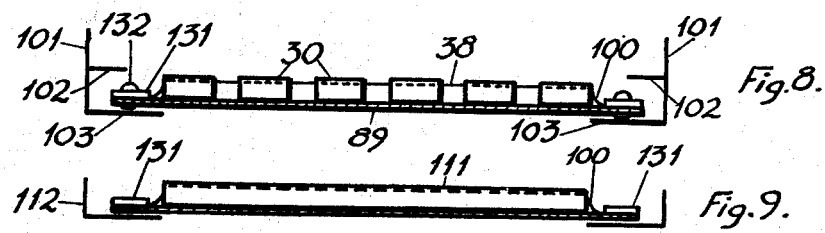
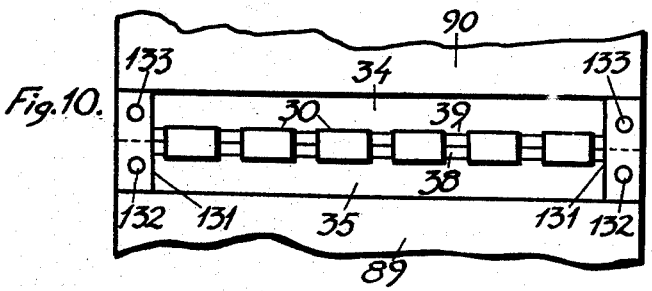
INVENTOR
HELGE FABIAN ROST
By
ATTORNEY Patented Aug. 24, 1954

2,687,209

UNITED STATES PATENT OFFICE 2,687,209

ENDLESS CONVEYER OR ELEVATOR BELT AND RESILIENT JOINT FOR SAME

Helge Fabian Rost, Djursholm, and Oscar Herman Waern, Eksjo, Sweden

Application September 20, 1950, Serial No. 185,856

Claims priority, application Sweden October 27, 1949

8 Claims. (Cl. 198—199)

The present invention refers to endless conveyer and/or elevator belts and resilient joints for same and more particularly to those used in farm machinery, such as harvester binders, headers, threshers and the like, conveyers and elevators in chocolate factories, bakeries, sand elevators and the like and in all other industries.

The invention can be used in combination with all kinds of belts, such as those made of canvas, rubberized fabric, resilient material, such as vulcanized resilient rubber and the like.

The object of the invention is to provide a conveyer or elevator belt that will give longer service and eliminate most of the need for repairing the devices now in use, which are easily damaged or made unfit for service due to cleats or slats of wood, metal or rubberized fabric, which are secured in place by fasteners tearing loose within a short period of time.

These defects are entirely overcome by various features of the invention, of which one feature provides a transverse section of resilient material joined to a conveyer or elevator belt of flexible material.

According to another feature of the invention slats of resilient material, preferably of triangular cross section, for example of vulcanized rubber, conveniently spaced transversely to the direction of movement of the belt and fastened to same, are provided.

According to another feature of the invention a resilient joint in an endless conveyer belt is introduced. Said joint is flexible and stretchable in longitudinal direction of the belt, particularly at the edges of said joint, which edges are moving next to the frame of the conveyer or elevator, where protruding screws or other protuberances often catch hold of the ends of slats and stiff joints of known belts, which slats and joints have the same or greater length than the width of the belt.

The object of the invention is evenly to distribute tensions in a belt by means of one or more resilient sections in the belt and/or by means of a resilient joint or joints, in order to prevent rupture of a belt which is not elastic, for example a belt of canvas or rubberized fabric.

In one embodiment of the invention the belt is made of vulcanized resilient rubber or rubberized fabric, whereby the entire belt or only such parts of the belt, which rub against the frame or shelves of said frame, consist of vulcanized rubber containing graphite, so that a lubricating action is obtained to enable the belt to glide over corresponding surfaces without too much wear.

These and other objects will become more apparent from the following description, in which:

Fig. 8 is a transverse view partly in section of a belt and joint in a frame, for example in a thresher.

Fig. 9 is a transverse view partly in section of a belt and a joint, for example in a binder.

Fig. 10 is a top view of a joint in a belt.

Fig. 11 is a side view, enlarged scale, of the joint shown in Fig. 12.

Figs. 12–13 are side and top views respectively of a conveyer and two elevator belts in a harvester binder.

Figure 1:
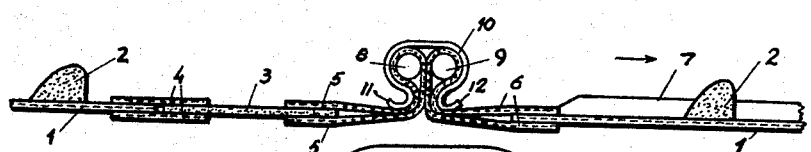
Fig. 1 is a side view of part of a belt and a joint in same.
Figure 2:
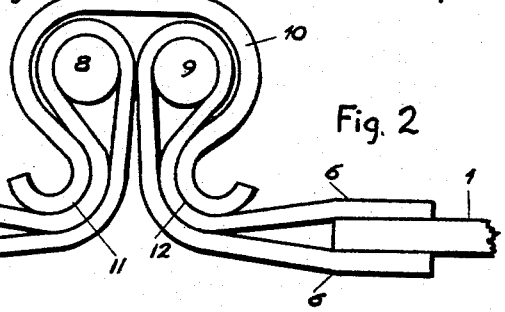
Fig. 2 is a side view of the joint shown in large scale.

In Figs. 1–2 element 1 is a conveyer or elevator belt consisting of canvas, rubberized fabric or resilient vulcanized rubber, if desired having a filler of graphite, whereby the graphite will act as lubricant to the surfaces of a frame over which the belt may slide. By this arrangement the belt is prevented from being partially worn.

The parts of the belt frame which may come in contact with the belt, for example the sides or the shelves can be provided with vulcanized rubber containing graphite, for example hard rubber graphite or other material of low friction coefficient.

Elements 2 are slats of vulcanized resilient rubber attached to the belt at desired intervals. Said slats can be attached to the belt by cement or by vulcanization. If the belt is made of rubber, the slats can be cast in one operation together with the rubber belt and vulcanized.

The slats serve to carry along the material to be transported in the direction indicated by arrow in the drawing. The slats can have triangular form as shown in the drawing, particularly when two belts are used as elevator, for example in a harvester binder as shown in Figs. 12–13. If one of the belts should stop or get stuck, the other belt can continue its movement, whereby the slats of one belt easily can slide over the slats of the other belt, particularly if the top belt is slack. In this manner the slats are prevented from engaging each other, which is often the case in binders, the belts of which are provided with slats of metal or wood.

Element 3 shows a section of a strip of resilient material, for example vulcanized rubber. Such a strip can be used at one or at both sides of the joint, when the belt consists of non-elastic material, for example rubberized fabric or the like.

By means of the inserted elastic section the tension in the stretched conveyer or elevator belt is uniformly distributed in the transport direction.

Elements 4 are splicing pieces consisting of rubber or rubberized fabric vulcanized to the non-elastic belt 1 and to the resilient section 3. Elements 5 and 6 show a manner of attaching the resilient section to a clamp 10, whereby 5 and 6 are made of vulcanized rubber or rubberized fabric vulcanized to the resilient section 3 and to the belt 1 respectively as shown in Fig. 1. Elements 5 and 6 are formed as sleeves, in which rods 8 and 9 of metal or of other suitable material are placed, whereafter a clamp 10 of spring steel sheet or of some other resilient material is placed over the sleeves and rods.

The clamp 10 has a cross section of two S-shaped members facing each other and of which the parts most remote from the belt are fixedly united. Between the S-shaped members adjacent the belt the members 5 and 6 are placed, whereby said clamp can be slidden from the edge of the belt over the sleeves 5 and 6 and the rods 8 and 9, or if the clamp is resilient and nevertheless stiff enough, it can be sufficiently opened and clamped over the said elements from above, particularly if a plurality of clamps are used as shown in Figs. 8, 10 and 13.

On account of the S-shaped parts 11 and 12 of the clamp 10 pressing against the members 5 and 6, the pressure between the clamp and the said members is distributed over great surfaces of the fabric or rubber material, whereby the double effect is obtained, that longitudinal stresses are evenly distributed in the belt, and that the belt or the members 5 and 6 will be substantially free from wear against the curved surfaces of the clamp 10.

In order to prevent the edges of the belt 1 from wear and tear against the walls of the machine, in which the belt is operating, the edges of the belt can be provided with reinforcing members 7 forming an integral part of the belt, if said belt is made of resilient vulcanized rubber. Said reinforcing member can consist of rubber using a filler of graphite, whereby lubrication between the edge of the belt and the wall will be obtained. Such a reinforcing member can be placed on both sides of the belt, and if the belt is made of other material than pure rubber, it can be cemented or vulcanized to the belt.

Figure 3:
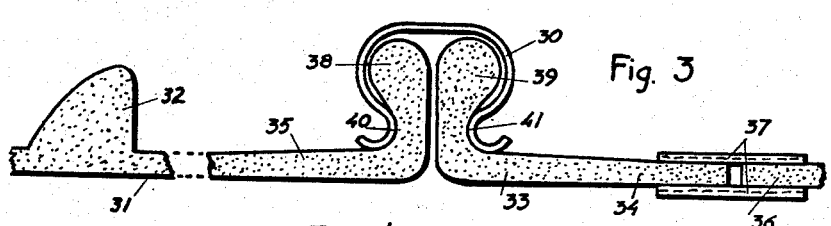
Fig. 3 is a side view of the joint provided with angle shaped strips of resilient material.

In Fig. 3, which shows a modification of the joint shown in Figs. 1-2, 31 is a conveyer or elevator belt of flexible material, for example resilient vulcanized rubber, rubberized fabric or other suitable material. Element 32 is a slat of resilient material, for example resilient rubber, cast or cemented or vulcanized onto the belt. Elements 34 and 35 are angle-shaped strips of resilient material, preferably vulcanized rubber, each of which has a leg attached to the edge of the belt to be jointed, and the other leg of the angel-shaped strip protruding over the outer surface of the belt, the ends 38, 39 of said protruding legs being torus-shaped and adapted tightly to fit into a belt end joining clamp 30 of similar shape and material as clamp 10 shown in Fig. 2.

The angle-shaped strips 33, 34 can be cast together with the belt 31, if the belt is made of the same material, for example resilient vulcanized rubber, or the said strips can be made separate and jointed to the belt in known manner, as shown to the right in the figure by means of rubberized pieces of fabric or of other material 37 vulcanized to the belt 36.

Clamp 30, which preferably is made of stiff but resilient material, for example spring steel or the like, has curved parts 40 and 41 pressing against the angle-shaped strips 35, 38 and 33, 39 so that the pressure between the clamp and the strips is distributed over substantially large surfaces along the edge of the belt to be jointed.

The resilient angle-shaped strips have been given a somewhat increased cross section in the direction from the edge of the belt to be jointed towards the torus in order to compensate for the stresses in the joint.

Figure 4:
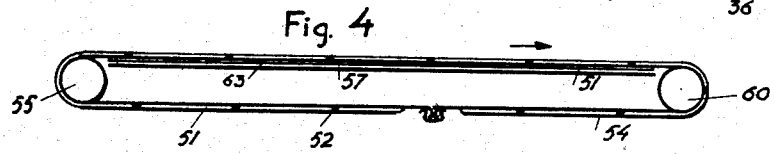
Fig. 4 is a side view of a belt running over two rollers, the belt being provided with slats of resilient material.
Figure 5:
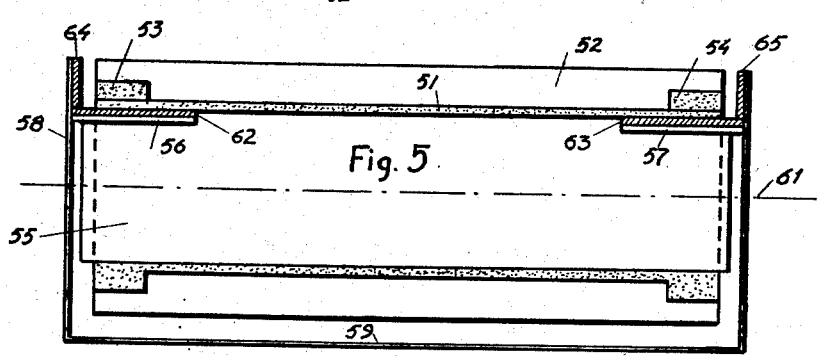
Fig. 5 is a transverse sectional view of a belt mounted in a frame for the convenience of protection to the conveyer or elevation belt.

In Figs. 4-5 a conveyer belt 51 provided with slats 52 and reinforced longitudinal edges 53, 54 is stretched between rollers 55 and 60 for transport in the direction of the arrow.

In conveyers and particularly in harvester machines it is important that particles of the transported material be prevented from entering between the two branches of the conveyer belt, because such particles will then be packed between the belt and the roller 55 rotating about an axis 61. This causes the belt to move to one or the other side so that one of the edges will rub against wall 58 of the machine.

In order to prevent said particles from entering between the branches of the belt, shelves 56 and 57 are generally arranged in the machine over which shelves the edges of the belt are supposed to slide. This continuous sliding of the belt over the metal shelves causes a considerable wear and tear in the belt.

To avoid this wear and tear the belt can be provided with reinforcements on the inner side at the edges similar to those 53, 54 shown in Fig. 5 on the outer side. Such reinforcements should have the same width as the shelf 56, 57, over which the reinforcements and belt should slide. Said reinforcements can conveniently consist of rubber having a filler of graphite, and the reinforcements can be vulcanized together with the belt when cast, if the belt consists of resilient rubber.

Instead of having graphite in the reinforcements, the shelves 56 and 57 can consist of or be provided with strips 62, 63 of lubricating material, and the walls can be provided with strips 64, 65 of the same material. Such strips can consist of fabric impregnated with Bakelite, having the surface impregnated with graphite, or preferably of rubber graphite.

On account of the different coefficients of expansion of the shelf of the machine and the lubricating strips, these should be fastened to respective shelves and walls so that the strips can freely move with respect to the frame.

Figure 6:
Figs. 6 and 7 are side and top views respectively of a shelf shown in Fig. 5, for example in a harvester machine and provided with a material of low friction coefficient, and over which material an edge of the belt is to slide.
Figure 7:
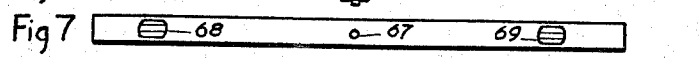

Such a strip can, for example, be fastened at its center to shelf 57, Figs. 6-7, by means of a rivet or screw 66 through hole 67. The ends can be free or they can be fastened to the shelf and which supports the strip by means of pins attached to the shelf and which pins fit into longitudinal slots 68, 69 in the lubricating strip.

If a phenol formaldehyde resin is polymerized or condensed together with rubber and graphite, a material should be obtained suitable for said strips, which in such a case will be tough, hard and possessing a low coefficient of friction.

In Figs. 8, 10, 12 and 13, which show a belt and a resilient joint in, for example, a thresher, the ends 89, 90 of the belt are jointed to resilient angle-shaped strips 35, 38 and 34, 39 respectively. Resilient clamps 30 like those shown in Figs. 1–3 are clamped over the torus-shaped ends 38, 39 of the resilient strips.

The legs of the angle-shaped strips protruding over the outer surface of the belt are preferably cut away a certain distance at both sides as shown at 100, Fig. 8, in order to prevent the torus-shaped strips 38, 39 or a clamp 30 from engaging any part or obstruction protruding from the frame 101 or shelves 102, 103, Fig. 8 or from frame 112, Fig. 9.

In order to prevent the edges of the belt ends 89, 90 from engaging said obstacles, a flat resilient or stretchable joining member 131 is attached at both sides to said belt ends or to the horizontal legs of the said resilient angle shaped strips or equivalent devices as shown in Figs. 8, 10–11.

The object of this construction is to obtain a flexible and resilient joint in a belt, which joint is easy to apply and to open, particularly in a thresher machine, in which a clamp cannot be applied from any of the edges of the belt due to the fact that belts in such harvesting machines are enclosed in a cover.

The clamps can be applied and removed by means of a special plier, and the clamps can be located close together or separated from each other as shown in Figs. 8 and 10.

If desired, a continuous clamp 111, preferably of resilient material, as shown in Fig. 9 can be used instead of a plurality of short clamps, if there is room for applying the clamp from the edge of the belt, for example in harvester binders.

If the belt is used in a harvesting machine, in which the belt and the slats have to run under guide shoes, the slats could have more or less the same form as the torus shaped legs of the resilient joint, in which case the slats and the joint could be provided with one or more long clamps in the center and a short clamp at either side with which arrangement the short clamps should be so placed as to slide over the guide shoes and thus protect the slats and the joint from being too much worn. If the short end clamps should become worn, they could be easily changed at little cost.

In Figs. 12–13, which show a conveyer and two elevator belts in a harvester binder, there are shown slats and joints according to features of the invention, the belts being provided with triangular slats 2 of resilient material.

The horizontal conveyer belt 89—90 runs over two rollers 83—84. The lower elevator belt 91 runs over two rollers 85—86 and the upper elevator belt 92 runs over two rollers 87—88.

According to an embodiment of the invention a belt of standard length 89 fitting a certain machine, for example a 5-foot harvester binder or thresher, can be provided with additional resilient sections and joints as shown in Figs 12–13, so that by adding for example 1- or 2-foot length sections, 6- or 7 foot belts can be obtained. By adding such sections and joints, the same belt can thus be used in different size harvester machines, whereby less numbers of different belts are needed to supply the market.

In Fig. 12 there is shown how the triangular slats of upper and lower elevator belts can slide over each other, if one belt should become slack and slide over the other.

In known constructions provided with stiff square slats of wood or of metal the slats in one belt often engage slats of the other belt, whereby the slats and belts are easily damaged.

It is understood that it is not always necessary to use flexible slats according to a feature of the invention, but that smooth or rippled resilient belts can be used on certain occasions.

While in the foregoing description we have shown and described the preferred embodiment of our invention, it will be understood that minor changes in construction, combination and arrangement of parts can be made without departing from the spirit and scope of the invention as claimed.

What we claim is:

1. A conveyer belt formed of flexible inelastic material, a section of elastic material incorporated therein and extending from edge to edge of the belt, at a transversal edge of said section a rib provided with a torus of the same elastic material and at about right angles to the outer surface of the said section and forming an integral part thereof, at a transversal edge of said belt of inelastic material a rib provided with a torus of elastic material attached to said transversal edge of said belt of inelastic material and at right angles to the outer surface of said belt, and at least one removable resilient clamp fitting two adjacent torus-shaped ribs forming a coupling to join the edge of said inelastic belt to the edge of said elastic section into an endless conveyer belt or to enable opening said endless belt when desired at the resulting joint.

2. A conveyer belt for a harvesting machine consisting of a plurality of sections of elastic material, all of about the same width, at a transversal edge of each section a rib provided with a torus of the same elastic material and arranged at about right angles to the outer surface of the said section and forming an integral part thereof, and at least one removable clamp fitting a torus-containing rib of each of two adjacent sections of said belt forming a coupling to join the edges of said sections into an endless belt or to enable opening the endless belt when desired at said joint between two sections.

3. In a harvesting machine a flexible endless conveyer belt formed of resilient material and having a joint therein, said joint comprising at each of two adjacent transversal edges of the belt a rib provided with a torus of the said resilient material and arranged at about right angles to the outer surface of the belt and forming an integral part thereof, said joint also comprising a plurality of removable resilient clamps fitting said adjacent ribs forming a coupling to join said edges of the said endless belt.

4. In a harvesting machine a flexible endless conveyer belt formed of resilient material, a plurality of ribs of about triangular cross section and of the same resilient material arranged at substantial distances from each other transversally to the direction of movement of the belt and forming integral parts thereof, a joint in said belt comprising at each transversal edge of the belt a rib provided with a torus of the same resilient material and arranged at substantially right angles to the outer surface of the belt and forming an integral part thereof, and a plurality of removable resilient clamps fitting said two ribs forming a coupling to join the edges of the said endless belt.

5. A conveyer belt as claimed in claim 1, in which the elastic material of the said section and of said torus-shaped ribs consists of vulcanized resilient rubber.

6. A conveyer belt as claimed in claim 2, in which the elastic material of said sections and of said torus-shaped ribs consists of vulcanized rubber.

7. A conveyer belt as claimed in claim 3, in which the resilient belt and of the torus-shaped ribs consists of vulcanized resilient rubber.

8. A conveyer belt as claimed in claim 4, in which the resilient material of the belt, of the triangular ribs and of the torus-containing ribs consists of vulcanized resilient rubber.

References Cited in the file of this patent

UNITED STATES PATENTS

| Number | Name | Date |
|---|---|---|
| 417,065 | Miller | Dec. 10, 1889 |
| 442,740 | Tattersall | Dec. 16, 1890 |
| 664,054 | Luckehe | Dec. 18, 1900 |
| 2,122,052 | Bell | June 28, 1938 |
| 2,400,667 | Toews | May 21, 1946 |

FOREIGN PATENTS

| Number | Country | Date |
|---|---|---|
| 393,103 | Germany | Apr. 3, 1924 |